United States Patent [19]

Hoshizaki et al.

[11] Patent Number: 4,803,345
[45] Date of Patent: Feb. 7, 1989

[54] CERAMIC HEATER APPARATUS WITH METAL ELECTRODES

[75] Inventors: Hiroki Hoshizaki, Anjo; Kazuo Oyobe, Oobu; Hirofumi Suzuki, Kariya; Nobuaki Kawahara, Anjo; Hitoshi Niwa, Okazaki; Terutaka Kageyama, Kariya, all of Japan

[73] Assignee: Nippondenso Co., Ltd., Kariya, Japan

[21] Appl. No.: 72,226

[22] Filed: Jul. 10, 1987

[30] Foreign Application Priority Data

Jul. 11, 1986 [JP] Japan ................. 61-163119
May 19, 1987 [JP] Japan ................. 62-119996

[51] Int. Cl.$^4$ ........................... H05B 3/10
[52] U.S. Cl. ........................... 219/553; 29/621; 219/202; 219/275; 219/541; 338/325; 338/329
[58] Field of Search ............... 219/553, 552, 541, 543, 219/504, 505, 271, 275, 252; 338/322–326, 329, 330, 333, 334, 309; 29/611, 612, 610, 621

[56] References Cited

U.S. PATENT DOCUMENTS 2,615,060 10/1952 Marinace et al. ............ 338/330 X
3,184,661  5/1965 Weller et al. ............... 338/322 X
4,652,727  3/1987 Hoshizuki et al. ........... 219/541

FOREIGN PATENT DOCUMENTS 4032 9/1926 Australia ...................... 338/330

Primary Examiner—C. L. Albritton
Attorney, Agent, or Firm—Cushman, Darby & Cushman

[57] ABSTRACT

A ceramic heater body is formed in a plate shape, and has electrode attaching portions at both ends of the heater body. A plurality of openings are formed in the electrode attaching portion, and a metallized layer is formed on the inner peripheral surface of each of the openings. Electrodes having a plurality of wires are connected to the electrode attaching portions, for supplying power to the heater body. The metal wires are inserted into the openings formed having the metallized layers on the inner peripheral surfaces, and are secured by brazing to the metallized layers. The diameter of the metal wire is set to 0.5 to 3 mm, and the metal wires are buried in the openings, at a depth of 1 to 5 mm.

22 Claims, 8 Drawing Sheets

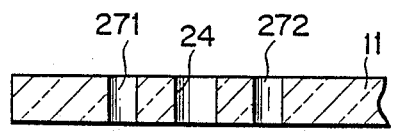
F I G. 5A
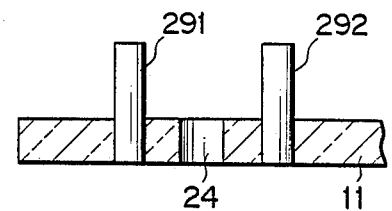
F I G. 5B
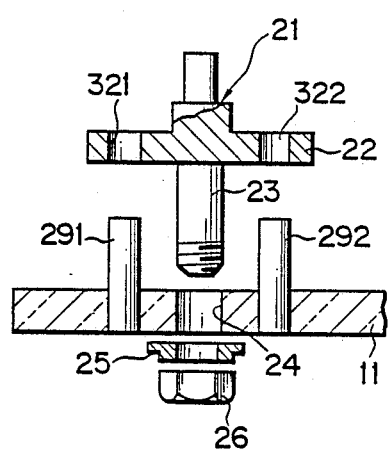
F I G. 5C
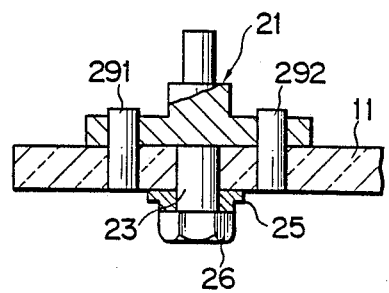
F I G. 5D

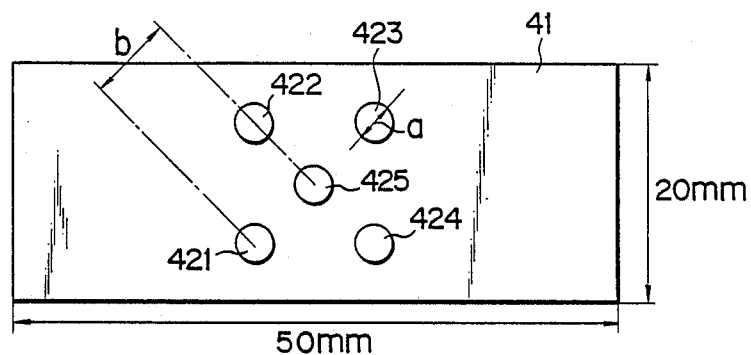
F I G. 6A
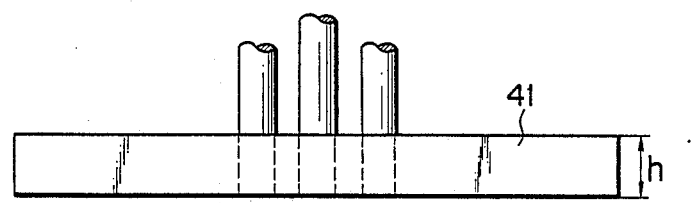
F I G. 6B
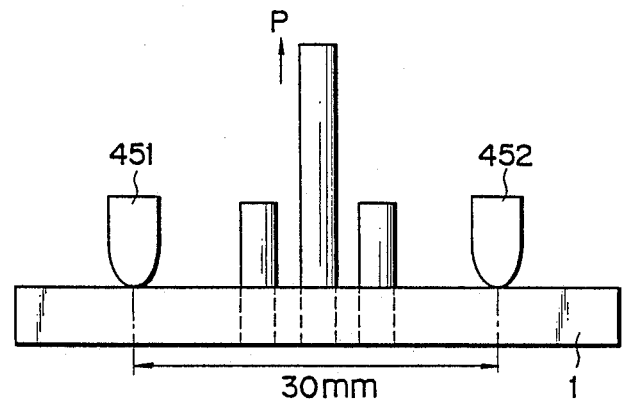
F I G. 7

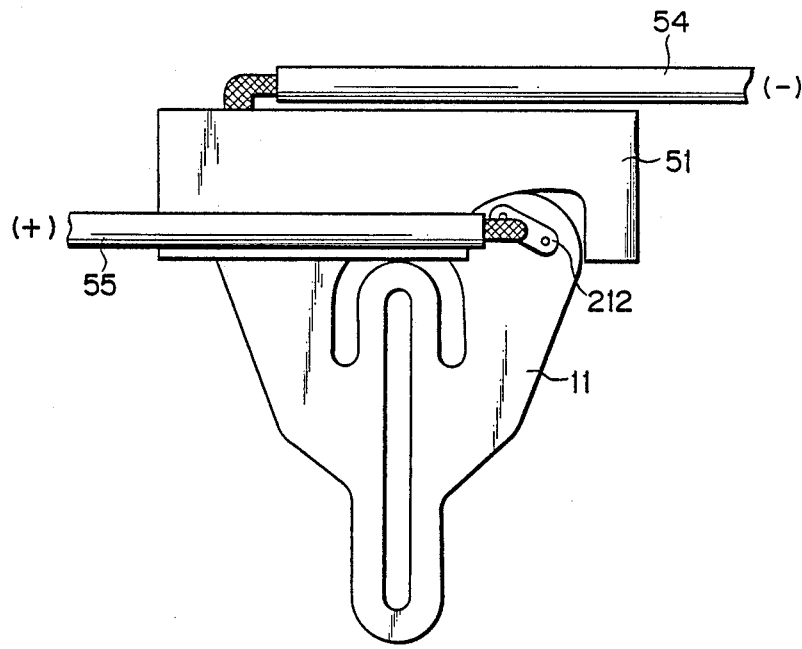
F I G. 8A
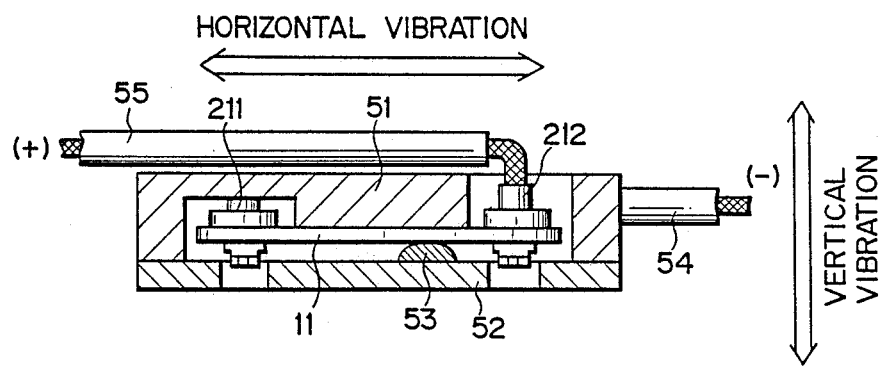
F I G. 8B

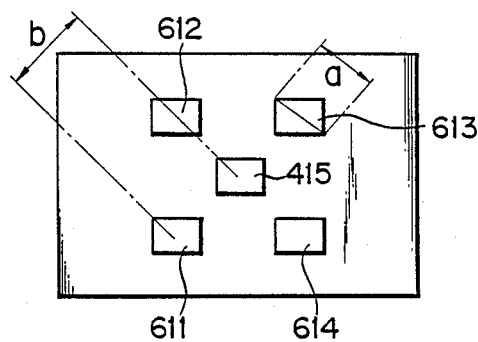
F I G. 9
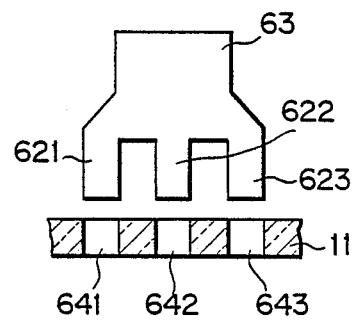
F I G. 10

CERAMIC HEATER APPARATUS WITH METAL ELECTRODES

BACKGROUND OF THE INVENTION

The present invention relates to a ceramic heater apparatus having metal electrodes and, more particularly, to a plate-like ceramic heater which is used as a regenerative heater for a diesel particulate filter and improved that metal electrode attachments are so set as to feed sufficient current capacity without remaining stress.

Ceramic heaters possess excellent heat resistance and corrosion resistance, in comparison with a metallic heater, and can be used in the type of severe conditions which a metallic heater could not withstand, and various utilities have been developed.

When a ceramic heater is intended to be used, for example, as a regenerative heater of a particulate collecting filter in a diesel engine, such a heater must be able to uniformly heat the relatively large surface area of the filter, and is therefore formed in a plate shape which corresponds to the shape of the filter surface.

The plate-like ceramic heater has drawbacks in use in the construction of a bonding portion of a ceramic heater body to metallic portions of electrodes for supplying electric power for heating. To this end, the bonding portion is metallized to attain a contact surface which is able to supply sufficient power in the bonding of the electrodes with a metal material.

FIGS. 12A-12C show the electrode leading portions of a regenerative ceramic heater of a conventional diesel particulate collecting filter. Ceramic heater body 70 is formed in a plate shape, and an electrode 71, made of a metal material, is bonded to heater body 70. Metallized layer 72, formed on the surface of body 70, corresponds to an electrode bonding surface portion to which electrode 71 is bonded by means of a brazing material 73.

The surface portion of electrode 71 is formed in a plate shape, so as to sufficiently provide the bonding area of electrode 71 to body 70, thereby setting a large current capacity. A lead 74 is connected to electrode 71, for supplying electric power thereto.

Ceramic heater body 70 and metal electrode 71 have, however, large thermal expansion coefficient difference. Large bonding area of electrode 71 to heater body 70 causes the residual tensile stress to increase after brazing. Repetitive thermal stresses immediately after brazing or due to repetition of power supply introduces a crack 75 as shown in FIG. 12C in heater body 70.

SUMMARY OF THE INVENTION

It is an object of the present invention to provide a ceramic heater apparatus in which an electrode made of a metal material is secured to a ceramic heater body formed, for example, in a plate shape in a state that residual tensile stress is sufficiently reduced to attain sufficient current capacity at the electrode bonding portion, thereby suppressing cracking, arising from the difference in thermal expansion coefficient therebetween.

Another object of the present invention is to provide a ceramic heater apparatus having metal electrodes, in which the metal electrodes are rigidly secured to the heater body, in order to eliminate a crack in the body, even when horizontal or vertical mechanical vibration acts on the body.

It is a further object of the invention to provide a ceramic heater apparatus which is attached, for example, to a particulate collecting filter section of a diesel engine to construct an electrode section capable of effectively regenerate the filter, attaining a sufficient current capacity, sufficiently reducing a residual stress and achieving sufficient durability against mechanical vibration.

In a ceramic heater apparatus according to the present invention, openings are formed in the electrode attaching portion of a ceramic heater body formed, for example, in a plate shape, metallized layers are formed on the inner surfaces of the openings, metal wires are inserted into the openings, to be brazed to the metallized layers, and thereby form an electrode section of the metal wires.

Further, electrode members are provided, having attaching shafts which pass through the heater body, the metal wires are bonded to the electrode members, and the heater body is held by the attaching shafts of the members.

Since the metal wires are buried in the ceramic heater body of the ceramic heater, the sides of the metal wires are effectively utilized for supplying a current, thereby readily increasing sufficiently the current capacity. More specifically, since the metal wires of metal members bonded to the heater body can be fabricated having a sufficiently small diameter, residual stresses in the metal wires can be sufficiently reduced even when brazing to effectively suppress a crack in the heater body. The heater body is held by the attaching shafts and collar portions passing through the heater body, so as to have sufficient endurance in relation to horizontal or vertical vibration, and can be securely attached, for example, to the exhaust manifold of diesel engine.

BRIEF DESCRIPTION OF THE DRAWINGS

FIGS. 5A-5D are views sequentially showing the assembling steps of the electrode section shown in FIG. 4;

FIG. 6A and FIG. 6B are plan and side views showing the state of a sample to be tested for the strength of an electrode structure shown in FIG. 2;

FIG. 7 is a view for describing means for achieving a tensile test with the sample;

FIGS. 8A and 8B are plan and sectional views for describing the state of a jig for achieving the vibration test of a ceramic heater shown in FIG. 3;

FIG. 9 is a view showing other examples of metal wires buried in the heater body;

FIG. 10 is a view for describing an example of the electrode member using the metal wire;

DETAILED DESCRIPTION OF THE PREFERRED EMBODIMENTS

Figure 1A:
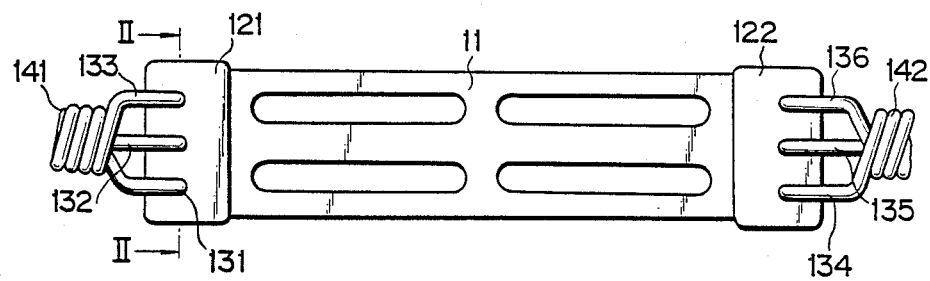
FIG. 1A is a plan view of a ceramic heater according to one embodiment of the present invention.
Figure 1B:
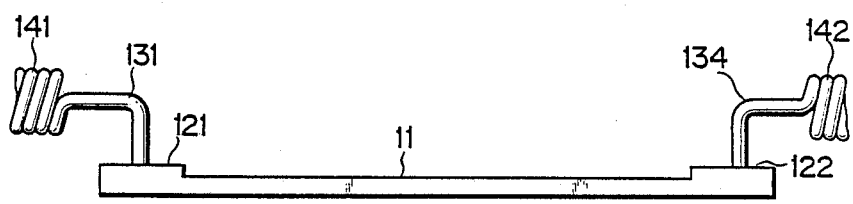
FIG. 1B is a side view of the ceramic heater.

In a first embodiment shown in FIGS. 1A and 1B, ceramic heater body 11 is formed in a plate-like slender shape. Electrode attaching portions 121 and 122 are respectively formed at both end portions of heater body 11, and a plurality of, for example, 3 metal wires 131 to 133, 134 to 136 are respectively secured to electrode attaching portions 121, 122. 3 metal wires 131 to 133 and 134 to 136 are respectively integrally twisted to form a pair of metal electrodes 141 and 142, and electric power for heating is supplied to between electrodes 141 and 142.

Figure 2:
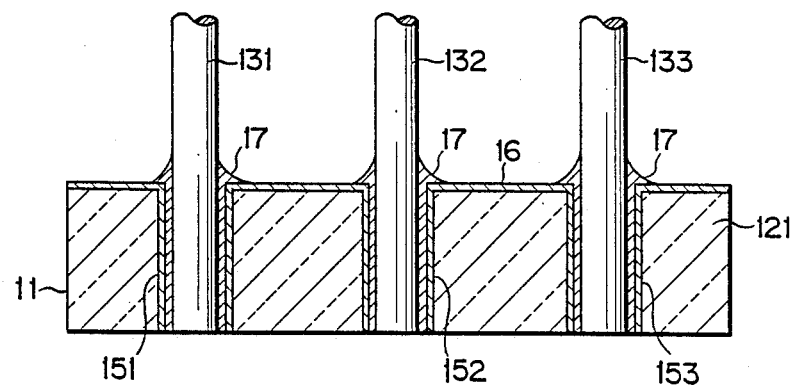
FIG. 2 is an enlarged sectional view showing a portion taken along the line II—II of FIG. 1A.

FIG. 2 shows one electrode attaching portion 121 of the ceramic heater, and the other electrode attaching portion 122 are similarly constructed.

More specifically, 3 openings 151 to 153 which penetrate heater body 11 are formed in a serially aligned state. Metallized layers 16 are respectively formed on the surface of heater body 11 corresponding to electrode attaching portion 121 in the state including the inner peripheral surfaces of openings 151 to 153. Metal wires 131 to 133 are respectively inserted into openings 151 to 153 in which metallized layers 16 are formed on the inner surfaces thereof in such a manner that metal wires 131 to 133 are bonded by brazing materials 17 to metallized layers 16 on the inner peripheral surfaces of openings 151 to 153.

Openings 151 to 153 are formed in diameters slightly larger than the outer diameters of metal wires 131 to 133 respectively inserted thereinto. Gaps of the degree that brazing materials 17 are interposed between the metallized layers 16 of the inner peripheral surfaces of openings 151 to 153 and metal wires 131 to 133 are formed therebetween in the state that metal wires 131 to 133 are respectively inserted into openings 151 to 153 after metallized layers 16 are formed in openings 151 to 153.

The diameters of metal wires 131 to 133 must fall within the range from 0.5 mm to 3 mm. If the diameter of metal wires is smaller than 0.5 mm, the interior of the metal wire is deteriorated in quality due to the influence of the brazing material after brazing, while if the diameter of metal wires is larger than 3.0 mm, the heater body cracks radially in the opening due to residual stress after brazing. The buried bonding depth of metal wires 131 to 133 is 1 mm to 5 mm. If the bonding depth is smaller than 1 mm, the metal wire is separated from the heater body after brazing, while if the bonding depth is larger than 5 mm, the heater body cracks axially in the opening by the residual stress. When a plurality of metal wires are buried and bonded, a distance between the centers of the metal wires must be set as large as twice of the diameter of the metal wire. If the distance between the metal wires is smaller than the twice of the diameter, the heater body cracks radially between the openings due to thermal shock caused by the repetition of current flows of the heater, thereby resulting in a decrease in the strength.

When the ceramic heater is thus constructed, metal wires 131 to 136 for forming the metal electrode to become electrode leading mechanisms are buried in ceramic heater body 11, the sides of metal wires 131 to 136 are respectively electrically connected to heater body 11 to effectively conduct therebetween, thereby readily increasing the area of the bonding portion. Therefore, even if the metal portions which operate as the electrodes are constructed in small area, sufficient current capacity to pass electric power for heating the ceramic heater can be readily established.

Figure 3:
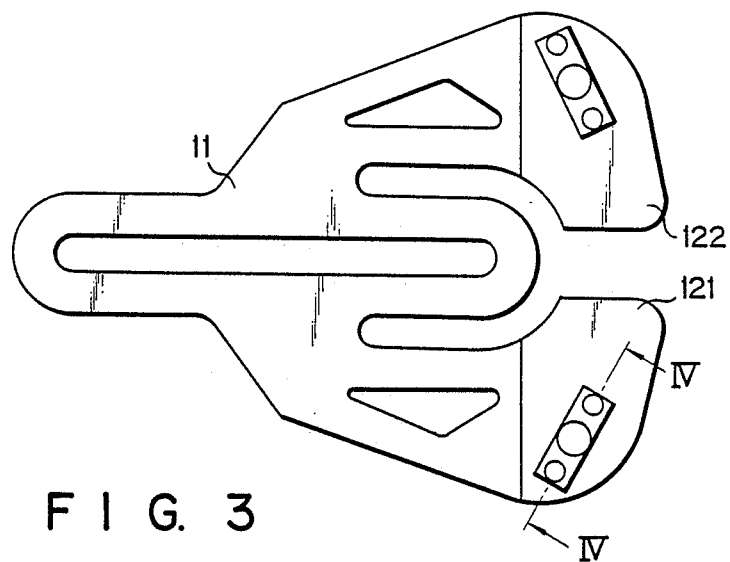
FIG. 3 is a plan view of a ceramic heater according to second embodiment of the present invention.

FIG. 3 shows an electrode leading portion of another embodiment of a ceramic heater apparatus according to the present invention. This second embodiment achieves large preferable effect against large vibration. In ceramic heater body 11, electrode attaching portions 121 and 122 are disposed adjacent to one another to form a current passage therebetween which becomes a heating portion at energizing time. The electrode attaching structure is shown in detail in FIG. 4.

Electrode member 21 is employed in the structure, and comprises collar 22 opposed to the surface of heater body 11, and attaching shaft 23 which penetrates from the central portion of collar 22. Shaft 23 penetrates shaft opening 24 formed through heater body 11, and nut 26 is engaged through spacer 25 with threads formed on one end of shaft 23 so that heater body 11 is interposed between collar 22 and spacer 25.

Openings 271, 272 are perforated at both side portions of shaft hole 24 of heater body 11, metallized layers 281, 281 are respectively formed on the inner peripheral surfaces of openings 271, 272, and metal wires 291, 292 are respectively inserted into openings 271, 272 in which metallized layers 281, 282 are formed, similarly to those in the first embodiment. Metal wires 291, 292 are respectively bonded into openings 271, 272 by brazing materials 301, 302.

Metal wires 291, 292 penetrate collar 22 of electrode member 21, and are integrally bonded by weldings at 311, 312 to collar 22. Wire members 291, 292 can be bonded to collar 22 by brazing materials.

The electrode section described above will be illustrated in the assembling sequence. As shown in FIG. 5A, electrode attaching portion 121 of heater body 11 is formed with a shaft opening 24, through which attaching shaft 23 of electrode member 21 penetrates. A plurality of, 2 openings 271, 272 are formed in heater body 11 to align linearly at both sides of shaft opening 24 to approach shaft opening 24. Metallized layers 281, 282 (which are omitted in FIG. 5A) are formed respectively on the inner peripheral surfaces of openings 271, 272. As shown in FIG. 5B, metal wires 291, 292 are respectively inserted into openings 271, 272, and bonded by brazing materials to openings 271, 272. In other words, metal wires 291, 292 are buried in electrode attaching portion 121 of heater body 11.

Metal electrode member 21 comprises, as shown in FIG. 5C, collar 22 formed to relatively increase its area, and attaching shaft 23 projected at the central portion of collar 22. Attaching shaft 23 is inserted into shaft opening 24. Openings 321 and 322 are formed in collar 22 such that they are located at the sides of attaching shaft 23, respectively. Therefore, metal wires 291 and 292 are inserted in openings 321 and 322, respectively. As shown in FIG. 5D, attaching shaft 23 is inserted into shaft opening 24, and metal wires 291 and 292 are accordingly inserted into openings 321 and 322 to assemble collar 22 and heater body 11.

In the assembled state as described above, nut 26 is engaged through spacer 25 with threads formed on one end portion of attaching shaft 23, and electrode member 21 is secured fixedly to electrode attaching portion 121 of heater body 11 by clamping nut 26.

After electrode member 21 is thus clamped, the ends of metal wires 291, 292 protruded from collar 22 of electrode member 21 are properly cut, and bonded by welding or brazing to metal wires 291, 292.

Ceramic heater body 11 is here manufactured, for example, as follows. Predetermined amounts of silicon nitride having 0.8 micron of mean particle diameter and titanium nitride having 0.5 micron of mean particle diameter are weighed, and mixture powder of composition of 41 mol % of silicon nitride and 55.4 mol % of titanium nitride is prepared. The mixture powder also contains sintering assistant of 2.2 mol % of $MgAl_2O_4$ and 1.4 mol % of $Y_2O_3$.

The mixture powder is mixed with organic solvent and binder as solvents to form a slurry, and formed in a sheet shape. The sheet is punched in a predetermined shape by considering the yield, laminated in a necessary thickness, and then organics are removed at 360° C. The sheet is then baked at 1750° C. in nitrogen atmosphere for 4 hours, and the surface of sintered sheet is properly polished.

Metallized layers 281, 282 formed on the inner peripheral surfaces of openings 271, 272 of heater body 11 thus constructed are formed, for example, as follows. 25 mol % of Pt, 62 mol % of Ni (83) - Cr (17) and 17 mol % of P are respectively weighed, and mixed with turpentine oil in which 3% by weight of ethyl cellulose is dissolved, in paste state. The peripheral surfaces of openings 271, 272 are coated with the paste, dried, and heat treated by holding the paste at 1200° C. for 10 min. under reduced pressure of $10^{-4}$ to $10^{-3}$ Torr, thereby forming metallized layers having approx. 50 microns thick.

Metal wires 291, 292 made of Ni having a predetermined diameter are inserted respectively into openings 291, 292 in which metallized layers 281, 282 are formed on the inner peripheral surfaces, heat treated at 1000° C. for 10 min. under reduced pressure of $10^{-4}$ to $10^{-3}$ by an ordinary Ni brazing to bond metal wires 291, 292 into openings 271, 272 in which metallized layers 281, 282 are formed on the inner peripheral surfaces.

Clearances for feeding brazing materials are set respectively in openings 271, 272 for burying metal wires 291, 292. Thus, diameters φ of openings 271, 272 are set to "φ=a+0.2 mm" larger by 0.2 mm than diameters a of metal wires 291, 292.

When a plurality of metal wires are buried, the distance between the central axes of metal wires is set as large as twice of the diameter of the metal wires. For example, the distance between the central axes of two openings 271 and 272 is set to 10 mm. The diameters of metal wires 291, 292 are set as large as 0.5 mm and as small as 3 mm. In the second embodiment, Ni wires having diameter φ=1.6 mm are employed. The bonding depth of the metal wires is set as large as 1 mm and as small as 5 mm. In the second embodiment, the thicknesses of electrode attaching portions 12a, 12b of heater body 11 are 3 mm, and the bonding depths of metal wires 291, 292 are set to 3 mm. In this case, the thickness of the heating portion of ceramic heater body 11 is 2 mm. Heater body 11 of this embodiment is formed as shown in FIG. 3 substantially in a triangular shape that the length of one side of the triangle is approx. 70 mm.

Figure 4:
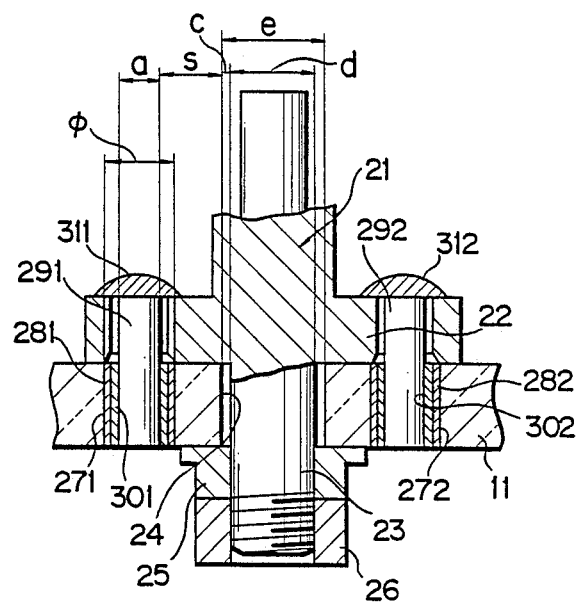
FIG. 4 is an enlarged sectional view showing an electrode section of a ceramic heater taken along the line IV—IV in FIG., 3.

Electrode member 21 and nut 26 are formed, for example, of kovar. Spacer 25 employs SUH310. Diameter d of attaching shaft 23 of electrode member 21 is "d=3.50 mm", and threads of M3.5 are cut on one end portions of shaft 23. Diameter e of shaft opening 24 perforated in ceramic heater body 11 is "e =3.55 mm", and clearance c of 0.025 mm is set between shaft 23 and shaft opening 24 (FIG. 4). The area of collar 22 contacted with electrode member 21 and heater body 11 is set to "6 mm × 13 mm", the thickness of collar 22 is set to 3 mm, and the inner diameters of openings 321, 322 perforated at collar 22 is set to 2 mm. Nut 26 for clamping attaching shaft 23 has approx. 6 mm of outer diameter and 1.6 mm of thickness, and spacer 25 has approx. 6.5 mm of outer diameter and 1.8 mm of thickness.

In the ceramic heater thus constructed, electrode member 21 is bonded to ceramic heater body 11 in a wide area, and electrode member 21 is connected to heater body 21 by buried metal wires 291, 292 rigidly in sufficient current capacity state. The electrode member 21 is connected to heater body 11 not by fusion-bonding collar 22 of relatively large area to heater body 11 so that no residual stress exists in the bonding portion. Electrode member 21 is connected by brazing only by metal wires 291, 292 to heater body 11, and the other mechanical bonding forces are set by nut 26 of electrode member 21.

When such a ceramic heater is used, for example, for regenerating particulate filter for a diesel engine, large vibration acts on the heater, and electrode attaching portions 121, 122 are subjected to large perpendicular and parallel mechanical vibrations. If electrode member 21 is not provided, tensile stress is concentrated at metal wires 291, 292 when perpendicular vibration is applied perpendicularly to the surface, and shearing stress is concentrated at metal wires 291, 292 when parallel vibration is applied.

Since the diameters are limited only with metal wires 291, 292 as described above, vibration resistance cannot be sufficiently enhanced. However, collar 22 and attaching shaft 23 are set to electrode member 21 in this embodiment, and collar 22 and shaft 23 act for connection to heater body 11. More specifically, ceramic heater body 11 is interposed between collar 22 of electrode member 21, spacer 25 and nut 28 to be held from both sides against vibration perpendicular to electrode faces to avoid the concentration of tensile stress to metal wires 291, 292, thereby absorbing the vibration by wide area of collar 22. Since attaching shaft 23 is not bonded directly to heater body 11, residual stress does not, even if the thickness is increased, so that metal wires 291, 292 can sufficiently support heater body 11 against strong vibration even if strong vibration is acted.

Since small clearance c is provided between attaching shaft 23 of electrode member 21 and shaft opening 24 of heater body 11, attaching shaft 23 can absorb vibration parallel to electrode surfaces so that shearing stress is not concentrated at metal wires 291, 292. Attaching shaft 23 can support heater body 11 sufficiently against strong vibration by increasing the thickness of attaching shaft 23.

Then, as shown in the embodiments described above, the results of the discussion for bonding strength of metal wires partially buried in ceramic heater body 11 as parts of electrode structure will be described.

Concrete means of bonding tests will be first described. Ceramic substrate 41 used as a heater having thickness h was prepared as shown in FIGS. 6A and 6B, and 5 openings were formed, for example, in ceramic substrate 41. Metallized layers were formed on substrate 41 together with openings, metal wires 421 to 425 having outer diameter a were inserted into the openings, and buried and secured by brazing. The distances among the central axes of metal wires 421 to 425 were set to b, and ceramic substrate 41 of test piece having "50 mm×20 mm" was used.

In order to set a clearance for feeding a brazing material, openings for burying metal wires 421 to 425 were formed as through openings having diameter "$\phi = a + 0.2$ mm" larger by 0.2 mm than the diameter of the metal wires. Ceramic substrate 41 to become the test piece and the metallized layers were constructed similarly to ceramic heater body 11 and the metallized layers formed on the body 11.

The samples constructed as described above were examined for the initial state after bonding the metal wires, and for the finalstate after thermal impact resistance and oxidation resistance tests by cutting and measured for breakdown strength so as to observe. initial bondability and durability.

The initial examination was observed by a microscope for the presence or absence of crack by cutting perpendicular or parallel to the axis of the bonding metal wires. To observe initial bonding strength after brazing, fulcra 451, 452 were set in span of 30 mm as shown in FIG. 7, a force P was acted to the center to conduct a tension test to observe the breakdown strength.

Thermal impact resistance and oxidation resistance tests were examined by reciprocating between a furnace at 800° C. and outside the furnace at room temperature at an interval of 120 sec., and examining the deterioration state after 100 hours (3000 cycles) in the same method as the above initial examination in comparison.

Tables 1 and 2 shown the results of the tests for samples Nos. 1 to 14.

TABLE 1

| No. | Bonding size (mm) | | |
|---|---|---|---|
| | Diameter (a) | Distance (b) | Depth (h) |
| 1 | 0.3 | 8 | 3 |
| 2 | 0.5 | 8 | 3 |
| 3 | 1.5 | 8 | 3 |
| 4 | 2.5 | 8 | 3 |
| 5 | 3 | 8 | 3 |
| 6 | 4 | 8 | 3 |
| 7 | 1.5 | 3 | 3 |
| 8 | 1.5 | 2 | 3 |
| 9 | 2.5 | 5 | 3 |
| 10 | 2.5 | 4 | 3 |
| 11 | 2.5 | 8 | 0.5 |
| 12 | 2.5 | 8 | 1 |
| 13 | 2.5 | 8 | 5 |
| 14 | 2.5 | 8 | 6 |

TABLE 2

| No. | Initial examination | | Thermal impact/oxidation resistances | |
|---|---|---|---|---|
| | Cut | Breakdown (kg · f) | Cut | Breakdown (kg · f) |
| 1 | d | 0.1 | i | — |
| 2 | o | 7.5 | o | 5.4 |
| 3 | o | 72 | o | 64 |
| 4 | o | 95 | o | 63 |
| 5 | o | 64 | o | 36 |
| 6 | x | 15 | e | 0.5 |
| 7 | o | 67 | o | 53 |
| 8 | o | 23 | x | 0.8 |
| 9 | o | 74 | o | 32 |
| 10 | o | 44 | x | 0.3 |
| 11 | x | 0.5 | e | 0.1 |
| 12 | o | 13 | o | 7 |
| 13 | o | 68 | o | 21 |

TABLE 2-continued

| No. | Initial examination | | Thermal impact/oxidation resistances | |
|---|---|---|---|---|
| | Cut | Breakdown (kg · f) | Cut | Breakdown (kg · f) |
| 14 | a | 18 | e | 0.9 |

"o": good, "d": wire deterioration, "x": radial crack
"a": axial crack, "i": oxidation cut, "e": crack extension Sample Nos. 1 to 6 indicates the results of the case that the central distance of the metal wires and the bonding depth were fixed while the diameters of the metal wires were varied. Deterioration in quality was observed in the metal wires of sample No. 1 having 0.3 mm of diameter due to the influence after brazing. Deterioration was also observed partly in the surface layers of metal wires of other samples. Radial crack occurred from the opening of the ceramic substrate after brazing in sample No. 6 having 4 mm of diameter. The other samples were observed in preferable states.

In initial breakdown test, samples Nos. 1 to 3 were cut at Ni metal wires near the tops of bonding portions. Since the tensile strengths of the metal wires are 50 kg/mm², sample No. 1 was expected for 3.5 kg.f, sample No. 2 was expected for 9.8 kg.f, sample No. 3 was expected for 88 kg.f, but the measured values were all lower than the expected values. This was considered that the strengths were reduced due to the deterioration of the metal wires at brazing time. Here, the deteriorating degrees of the strengths of sample Nos. 2 and 3 were approximately 70 to 80%, while that of sample No. 1 decreased to approx. 3% and confirmed that, when the diameters of the metal wires decreased, the strengths of the metal wires abruptly reduced.

Sample Nos. 4 to 6 were damaged from the ceramic portions. This was because, since the diameters of the metal wires were large, the metal strength overcome the ceramic strength. The tests in FIG. 7 were considered to provide effects similar to 3-point bending tests of the ceramic material. The 3-point bending strength of $TiN-Si_3N_4$ used as a sample was approx. 40 kg/mm², and the breakdown load to be expected was 160 kg.f. Sample Nos. 4 to 6 all exhibited smaller values than this value, and this was considered that fine cracks occurred due to residual stress due to thermal expansion coefficient difference. The larger the diameters of the metal wires increase, the greater the deteriorating degree increases. Thus, sample Nos. 4 and 5 indicated 40 to 60%, while sample No. 6 exhibited 10% or less of the deterioration.

From the results of thermal impact resistance and oxidation resistance tests of the above-mentioned samples, No. 1 disconnected wires due to oxidation, and No. 6 developed the crack almost without strength. The results of cutting examination of sample Nos. 2 to 5 were preferable, the strengths were slightly decreased, but the samples was observed for sufficiently durability for use. From the results, it was identified that the diameter of the metal wires were properly in a range of 0.5 to 3 mm.

Sample Nos. 7 to 10 indicated the test results of the case that the distance b between the centers of the metal wires having 1.5 mm and 2.5 mm was altered. All the samples exhibited preferable results at the initial period, but sample Nos. 4 and 9 having the distance between the central points of the metal wires was twice of the diameter of the metal wire exhibited good results in durability, while the other samples having the distance between the central points of the metal wires was shorter than the twice caused the portion between the openings to radially crack so that the strengths decreased. Therefore, the distance b between the central points of the metal wires was identified to be desirably twice the diameter of the metal wire.

Sample Nos. 11 to 14 exhibited the test results of the case that the diameter a of the metal wires and the distance b between the central points of the metal wires were fixed, and the bonding depth was altered. Sample No. 11 having 0.5 mm of bonding depth cracked from the opening, and exfoliation occurred in the bonding portion. Sample Nos. 14 having 6 mm of bonding depth cracked axially of the opening.

Sample Nos. 12 and 13 having 1 mm and 5 mm of depth exhibited good results.

In endurance tests, sample Nos. 11 and 14 exhibited large decrease in the strength, while sample Nos. 12 and 13 indicated sufficiently durable strength. From the results, the bonding depth of the metal wires was identified to be preferably 1 to 5 mm.

In the embodiment, through openings were formed in the ceramic substrate, and metal wires were buried in the openings. The openings for burying the metal wires are not necessarily through openings. Even if the openings are not through, the conditions of the bonding depth are the same.

As described above, the metal wires are buried to be bonded to heater body 11 to be able to feed sufficient current for heating and to improve thermal impact resistance. In order to further enhance the vibration resistance, the case of the electrode structure as shown in FIGS. 3 and 4 was observed.

When the diameter of attaching shaft 23 of electrode member 21 is d, the clearance between shaft 23 and shaft opening 24 is c and an interval between openings 271, 272 for inserting the metal wires and shaft opening 24 is s, the settling conditions of d, c and s are important to improve the vibration resistance. Table 3 indicates the discussed results of the sections, and the evaluation was determined by manufacturing a jig as shown in FIGS. 8A and 8B, energizing the heater in the state that vibration was applied to the jig and observing the endurance.

In the jig, the upper surface of ceraiic heater body 11 is contacted with upper metal case 51, and heater body 11 is supported through cushion 53 by lower metal case 52. A spinel is metallized to the contacting surface of upper metal case 51 with heater body 11 to insulate between heater body 11 and metal case 51. Negative side electrode member 211 is welded to upper metal case 51 to hold the ceramic heater, negative side lead 54 is connected to upper metal case 51, and positive side lead 55 is connected to positive side electrode member 212.

TABLE 3

| No. | Dimensions (mm) (d) | (c) | (s) | Dia. of wire (mm) | Vibration resist. evaluation (Time, o · x) 40G | | 50G | | 60G | |
|---|---|---|---|---|---|---|---|---|---|---|
| 0 | — | — | — | 1.6 | 0.1 | x | — | | — | |
| 1 | 3 | 0.025 | 1.5 | 1.6 | 10 | o | 10 | o | 0.3 | x |
| 2 | 3.5 | ↑ | ↑ | ↑ | 10 | o | 10 | o | 10 | o |
| 3 | 4 | ↑ | ↑ | ↑ | 10 | o | 10 | o | 10 | o |
| 4 | 5 | ↑ | ↑ | ↑ | 10 | o | 10 | o | 10 | o |
| 5 | 6 | ↑ | ↑ | ↑ | 10 | o | 10 | o | 10 | o |
| 6 | 3.5 | 0.00 | ↑ | ↑ | 8 | x | — | | — | |
| 7 | ↑ | 0.01 | ↑ | ↑ | 10 | o | 10 | o | 10 | o |
| 8 | ↑ | 0.05 | ↑ | ↑ | 10 | o | 10 | o | 10 | o |
| 9 | ↑ | 0.1 | ↑ | ↑ | 10 | o | 10 | o | 10 | o |
| 10 | ↑ | 0.2 | ↑ | ↑ | 10 | o | 10 | o | 10 | o |

TABLE 3-continued

| No. | Dimensions (mm) (d) | (c) | (s) | Dia. of wire (mm) | Vibration resist. evaluation (Time, o · x) 40G | | 50G | | 60G | |
|---|---|---|---|---|---|---|---|---|---|---|
| 11 | ↑ | 0.3 | ↑ | ↑ | 10 | o | 2 | x | — | |
| 12 | 6 | 0.00 | ↑ | ↑ | 0.5 | x | — | | — | |
| 13 | ↑ | 0.01 | ↑ | ↑ | 10 | o | 10 | o | 10 | o |
| 14 | ↑ | 0.2 | ↑ | ↑ | 10 | o | 10 | o | 10 | o |
| 15 | ↑ | 0.3 | ↑ | ↑ | 10 | o | 6 | x | — | |
| 16 | 3 | 0.2 | ↑ | ↑ | 10 | o | 4 | x | — | |
| 17 | 3.5 | 0.025 | 0.5 | ↑ | 10 | o | 10 | o | 3 | x |
| 18 | ↑ | ↑ | 0.8 | ↑ | 10 | o | 10 | o | 10 | o |
| 19 | ↑ | ↑ | 1.0 | ↑ | 10 | o | 10 | o | 10 | o |
| 20 | ↑ | ↑ | 0.8 | 2.0 | 10 | o | 10 | o | 5 | x |
| 21 | ↑ | ↑ | 1.0 | ↑ | 10 | o | 10 | o | 10 | o |
| 22 | ↑ | ↑ | 1.2 | ↑ | 10 | o | 10 | o | 10 | o |

The resistance values of the ceramic heater used when evaluated as indicated in Table 3 were all approximately 0.15 ohm at room temperature, and the test was conducted by continuous power 600W. The temperature of the heated portion of the heater was approximately 1300° C.

Vibration accelerations were sequentially raised to 40G, 50G and 60G at every 10 hour lapse as shown in Table 3, and the vibrating frequency was swept between 90 and 200 Hz in 2 min. cycle. The direction of applied vibration was parallel to the electrode surface as shown in FIG. 8B, and perpendicular results exhibited preferable performance as compared with the results indicated in Table 3.

In Table 3, the results of sample No. 0 exemplified the case that the electrode member did not have attaching shaft. In this example, collar 22 of the electrode member was connected to the heater body only by metal wires 291 and 292. Thus, the weight of electrode member 21 including collar 22 is all applied to two metal wires 291, 292, the metal wires were cut by the vibration of 40G for 0.1 hour to become impossible to supply power thereto.

Nos. 1 to 5 exhibited tests of the case that diameter d of electrode member attaching shaft 23 was varied. In the test using shaft 23 having 3 mm of diameter, the shaft and the metal wires were cut by the vibration of 60G for 0.3 hour to become impossible to supply power thereto. Thus, it was identified that attaching shaft 23 having 3 mm of diameter could not endure against the vibration of 60G. Attaching shaft 23 having 3.5 to 6 mm of diameter exhibited no abnormality by the vibration of 60G after 10 hours. Therefore, it was identified that the diameter of attaching shaft 23 must be at least 3.5 mm.

Nos. 6 to 15 exhibited the results of the test that clearance d between attaching shaft 23 of electrode member 21 and shaft opening 24 of heater body 11 was varied. In No. 6 having no clearance c, shaft opening 24 of heater body 11 cracked during the test that the vibration of 40G was applied for 8 hours to become impossible to supply power thereto. No. 12 similarly damaged in heater body 11 by the vibration of 40G after 0.5 hour. This is considered because the thermal expansion coefficients of ceramic heater body 11 was smaller than the metal and no clearance c existed so that stress was generated around shaft opening 24 due to thermal expansion of attaching shaft made of metal, thereby causing the heater body to damage.

No. 11 having 0.3 mm of large clearance c was cut at the metal wires by applying the vibration of 50G for 2 hours to be damaged. No. 15 having 6 mm of diameter of attaching shaft 22 and 0.3 mm of clearance was also damaged at the metal wires by the vibration of 50G for 6 hours.

This was considered that, since the clearance c was 0.3 mm large, attaching shaft 23 did not establish the vibration absorbing effect.

Sample Nos. 7 to 10 and Nos. 13 and 14 having 0.01 to 0.2 mm of clearance c exhibited no abnormality by the vibration of 60G for 10 hours after the test. From these experimental results, it is necessary to set clearance c to 0.01 to 0.2 mm.

Sample No. 16 having 3 mm of diameter of attaching shaft 23 and 0.2 mm of clearance were both damaged at attaching shaft 23 and metal wires 291, 292 by the vibration of 50G for 4 hours.

Nos. 17 to 22 exhibited the results of the tests that the interval s between shaft opening 24 of heater body 11 to which attaching shaft 23 of electrode member 21 was inserted and openings 271, 272 of heater body 11 to which metal wires 291, 292 were inserted was altered. No. 17 having 1.6 mm of the diameter of metal wire and 0.5 mm of interval s was cracked at shaft opening 24 of heater body 11 and between openings 271, 272 by the vibration of 60G for 3 hours to be damaged. The peripheries of openings 271, 272 to which metal wires of ceramic heater body 11 are buried are weakened due to residual stress at brazing time owing to the difference of thermal expansion coefficients therebetween. Therefore, it is considered that, if the interval s is short, the influence of the vibration is readily affected.

Sample Nos. 18 and 19 having 0.8 and 1 mm of intervals s exhibited no abnormality by the vibration of 60G for 10 hours. No. 20 having 2 mm of diameter of metal wires and 0.8 mm of interval s was damaged by 60G for 5 hours. On the other hand, Nos. 21 and 22 having 1.0 and 1.2 mm of intervals s exhibited no abnormality.

As apparent from the test results described above, it is identified that the interval s of openings 271, 272 formed in ceramic heater body 11 and between shaft openings 24 must be as long as radius of metal wires 291, 292.

In the embodiments described above, metal wires buried in heater body 11 have been described to be cylindrical. However, the present invention is not limited to the particular embodiments such as cylindrical. For example, as shown in FIG. 9, metal wires may be formed of square-section metal wires 611 to 615. The diameters a of of metal wires 611 to 615 are of the length of diagonal line, and the distance b between the central points of the metal wires may be of dimension as shown in FIG. 9.

In electrode structure using square-sectional metal wires described above, electrode elements 63 of the structure that a plurality of legs 621 to 623 of forked shape of metal plate are protruded as shown in FIG. 10 may be employed. In other words, legs 621 to 623 of element 63 are respectively inserted to openings 641 to 643 formed in ceramic heater body 11 and brazed fixedly.

Figure 11A:
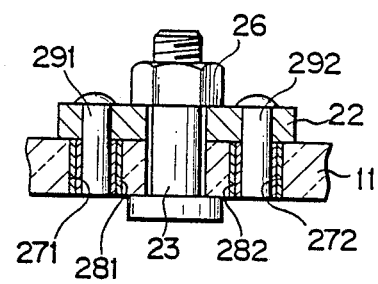
FIGS. 11A to FIG. 11C are sectional views for describing the structure of electrode section of a ceramic heater according to third to fifth embodiments of the invention.
Figure 11B:
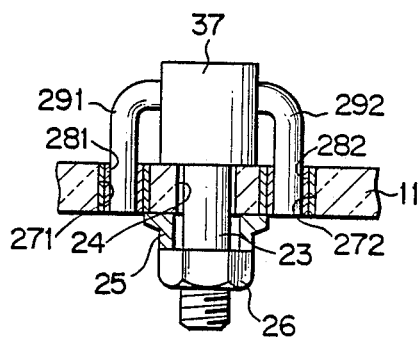
Figure 11C:
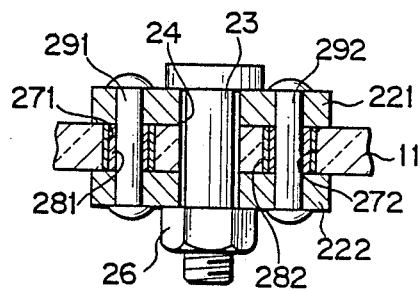
Figure 12:
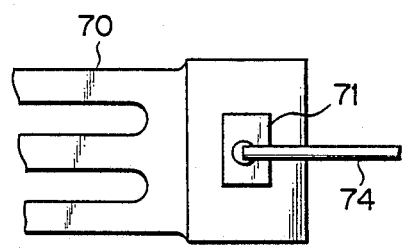
FIGS. 12A and 12B are plan and side views showing the electrode sections of a conventional ceramic heater.
FIG. 12C is an enlarged sectional view of electrode attaching portion of the heater shown in FIGS. 12A and 12B.
Figure 12:
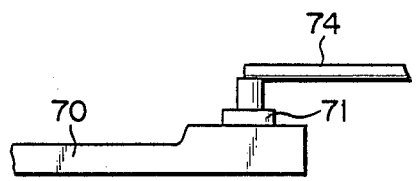
Figure 12:
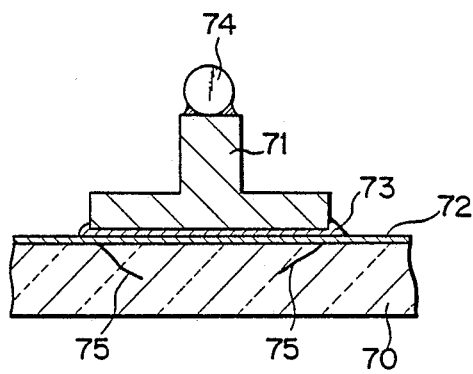

FIG. 11A to FIG. 11C show other modified embodiments of electrode structures shown in FIG. 4. FIG. 11A shows collar 22 for forming an electrode member is separated from attaching shaft 23. In other words, metallized layers 281, 282 are formed in openings 271, 272 formed in heater body 11, metal wires 291, 292 are buried in openings 271, 272 by brazing, and collar 22 is attached to heater body 11 similarly to the second embodiment of FIG. 4. Through openings are formed in collar 22 and heater body 11 as a common shaft, and attaching shaft 23 is inserted to the opening and clamped by nut 26. A proper clearance is properly set around attaching shaft 23.

In the electrode structure shown in FIG. 11B, a cylindrical electrode substrate 37 is set as a member corresponding to collar 22, and metal wires 291, 292 are extended and bent at upper ends thereof, and bonded by brazing to electrode substrate 37. The burying structure of metal wires 291, 292 to heater body 11 is similar to those of the embodiments described above, and electrode substrate 37 is attached to heater body by attaching shaft 23.

In the embodiment shown in FIG. 11C, metal wires 291, 292 set in openings 271, 272 formed at ceramic heater body 11 are protruded from both side surfaces of heater body 11. Metal wires 291, 292 are buried by brazing into openings 271, 272 in which metallized layers 281, 282 are formed on the inner surfaces similarly to the embodiments described above. Collars 221 and 222 are opposed on both side surfaces of heater body 11 by welding to metal wires 291, 292. Collars 221 and 222 are clamped fixedly by attaching shaft 23 inserted through shaft opening 28 formed in heater body 11 and nut 26.

The ceramic heater thus constructed achieves greater effect particularly in the case that large thermal impact resistance and oxidation resistance are required, and the structure of electrode section can be formed in high reliability. In other words, the heater can be effectively used as a heater for a diesel particulate filter, the metal wires buried in the heater body can be also used as electrode leads, thereby greatly simplifying the structure.

What is claimed is:

1. A ceramic heater apparatus having metal electrodes, comprising:
    a heater body formed of a ceramic material and having electrode attaching ends for supplying power for heating;
    means defining an opening respectively in each of the electrode attaching ends of the ceramic heater body;
    a metallized layer formed at least on the inner peripheral surface of each of said openings;
    a metal electrode inserted in each of the openings on the inner peripheral surface of which the metallized layer is formed; and
    a brazing material filled, in a molten state, in a clearance between the metallized layer and the metal electrode to bond them together.

2. An apparatus according to claim 1, wherein said heater body is formed of a plate-like ceramic material.

3. An apparatus according to claim 2, wherein sadi electrode attaching ends are formed 50 that the platelike ceramic material is thickened.

4. An apparatus according to claim 2, wherein the opening is formed in the plate-like heater body.

5. An apparatus according to claim !, wherein the metal electrode inserted through the metallized layer into said opening is made of a wire having a diameter within the range from 0.5 mm to 3 mm.

6. An apparatus according to claim 1, wherein the depth said metal wire electrodes arm buried in said opening means is set to 1 to 5 mm.

7. A ceramic heater apparatus having metal electrodes, comprising:
    a heater body formed of a ceramic material and having electrode attaching ends for supplying power for heating;

a plurality of openings formed in each of said electrode attaching ends, said openings being disposed close to one another;
a metallized layer formed at least on the inner peripheral surface of each of said openings; and
metal electrodes including a plurality of metal wires inserted respectively into the plurality of openings in which the metallized layer is formed on the inner peripheral surface and bonded by brazing to the metallized layer, the interval of the metal wires inserted respectively into the openings being set at least twice of the diameter of the metal wire.

8. A ceramic heater apparatus having metal electrodes, comprising:
a heater body formed of a ceramic material and having electrode attaching ends for supplying power for heating;
means defining an opening respectively in each of the electrode attaching ends of the ceramic heater body;
a metalized layer formed at least on the inner peripheral surface of each of said openings;
metal electrodes in each of the openings in which the metallized layer is formed on the inner peripheral surface and bonded by brazing to the metallized layer; and
an electrode member having a shaft attached to penetrate a shaft opening perforated through the electrode attaching end of said heater body, to thereby attach the electrode member to the heater body by means of the attaching shaft, and the metal wire electrodes are bonded to the electorde member.

9. An apparatus according to claim 8, wherein said electrode member comprises a collar member opposed to the surface of the electrode attaching end of said heater body, the collar member being opposed thereto by means of the attaching shaft.

10. An apparatus according to claim 9, further comprising an attaching opening for inserting the metal electrode attached to the heater body, which is formed in the collar member, and the metal electrode is inserted into the attaching opening.

11. An apparatus according to claim 10, wherein said attaching shaft is integrally formed with the collar member, to protrude from one surface of he collar member, said attaching shaft is inserted into the shaft opening formed in the heater body, and the heater body is interposed to be held fixedly by a nut engaged with the end of said attaching shaft penetrating the shaft opening and said collar member.

12. An apparatus according to claim 10, wherein said collar member is formed with an opening of the coaxial state with the shaft opening formed in the electrode attaching portion of said heater body, in such a manner that the opening of the collar member is coaxially set to the shaft opening, said attaching shaft is inserted in the state of penetrating the collar member and the heater body, and the collar member is opposed to the surface of the electrode attaching portion of the heater body by means of the attaching shaft.

13. An apparatus according to claim 8, wherein the shaft opening formed in the electrode attaching portion of said heater body for penetrating said attaching shaft has a diameter of at least 3.5 mm.

14. An apparatus according to claim 8, wherein a clearance of 0.01 to 1.2 mm is set between the shaft opening formed in the electrode attaching portion of said heater body and said attaching shaft penetrating the shaft opening.

15. A cearmic heater apparatus having metal electrodes, comprising:
a heater body formed of a ceramic material and having electrode attaching ends for supplying power for heating;
means defining an opening respectively in each of the electrode attaching ends of the ceramic heater body;
a metallized layer formed at least on the inner peripheral surface of each of said openings;
metal electrodes inserted in each of the openings in which the metallized layer is formed on the inner peripheral surface and bonded by brazing to the metallized layer;
a shaft opening penetrated at the position approaching said opening in the electrode attaching ends of said heater body; and
an electrode member having an attaching shaft penetrated to said shaft opening and bonded to said metal electrode, so that the shortest distance between said shaft opening and said opening means is as long as the radius of said metal electrode inserted into said opening means.

16. A ceramic heater apparatus having metal electrodes comprising:
a heater body formed of a ceramic material and having a plurality of openings formed in the ceramic heater body;
a metallized layer formed at least on the inner peripheral surface of said openings;
metal electrodes formed of metal wires inserted into the opening formed with the metallized layer on the inner peripheral surface of the opening and bonded by brazing to the metallized layer;
a shaft opening formed to penetrate the heater body at the position approaching said opening in said heater body; and
an electrode member having an attaching shaft penetrated to said shaft opening, secured to the heater body by the attaching shaft, and connected to metal wires inserted respectively into the openings.

17. An apparatus according to claim 19, wherein a plurality of openings are arranged at both sides of the shaft opening, to align on a linear line passing the shaft opening, so that the shortest distance between the shaft opening and the opening adjacent to the shaft opening is at least as long as the radius of the metal wire inserted into the opening.

18. An apparatus according to claim 7, wherein saisd heater body is formed of a plate-like ceramic material.

19. An apparatus according to claim 18, wherein said electrode attaching ends are formed so that the plate-like ceramic material is thickened.

20. An apparatus according to claim 18, wherein the opening is formed in the plate-like heater body.

21. An apparatus according to claim 7, wherein the metal electrode inserted through the metallized layer into said opening is made of a wire having a diameter within the range from 0.5 mm to 3 mm.

22. An apparatus according to claim 7, wherein the depth said metal wire electrodes are inserted in said opening means is set to 1 to 5 mm.

* * * * *